J. E. BELL.
STACK SEALING DEVICE.
APPLICATION FILED AUG. 2, 1918.
1,311,435.
Patented July 29, 1919.
2 SHEETS—SHEET 1.
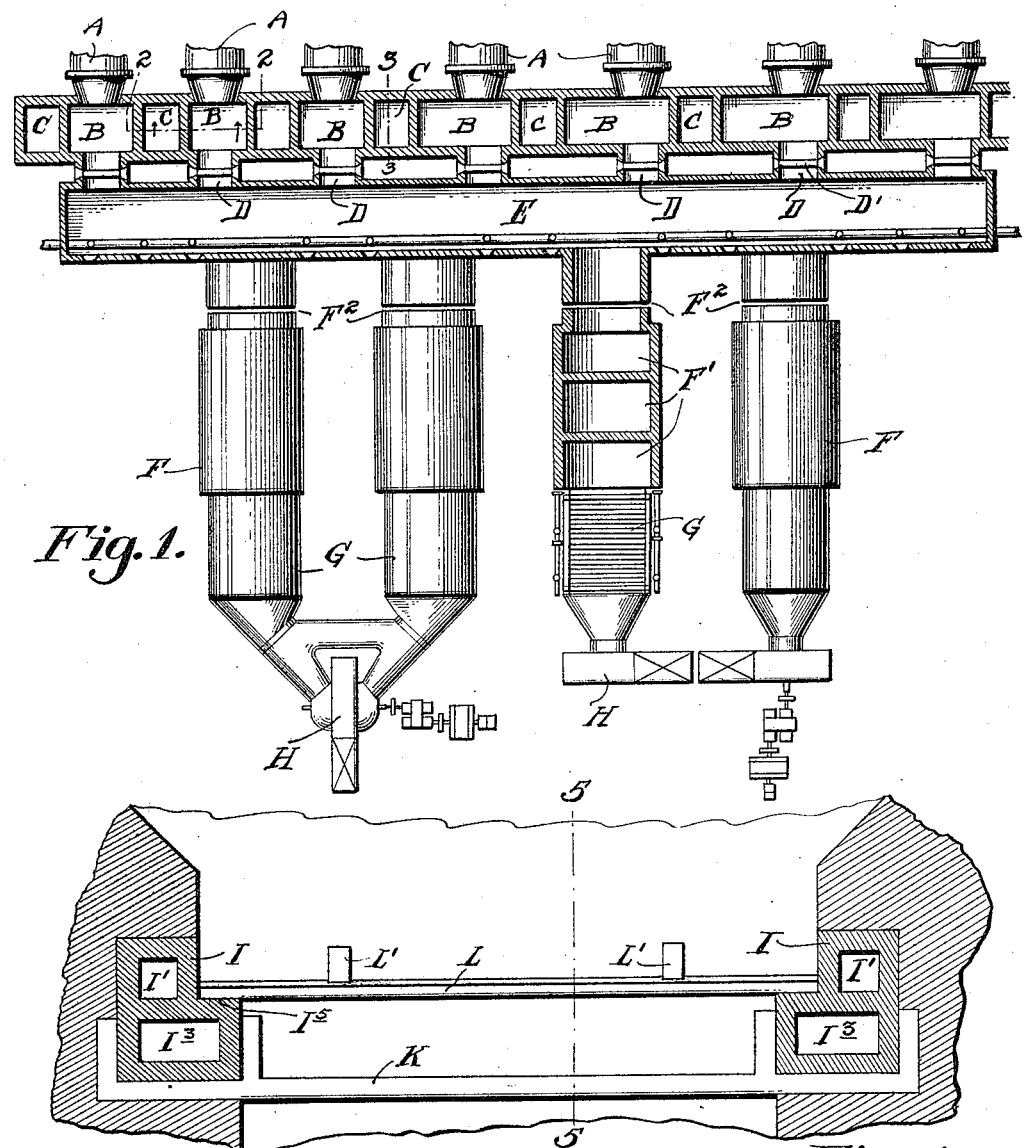
Fig. 1.
Fig. 4.
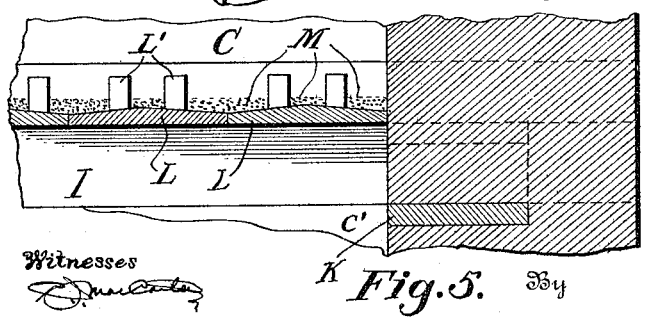
Fig. 5.
Witnesses
Inventor
John E. Bell
Chambers & Hubbell
his Attorneys J. E. BELL.
STACK SEALING DEVICE.
APPLICATION FILED AUG. 2, 1918.
1,311,435.
Patented July 29, 1919.
2 SHEETS—SHEET 2.
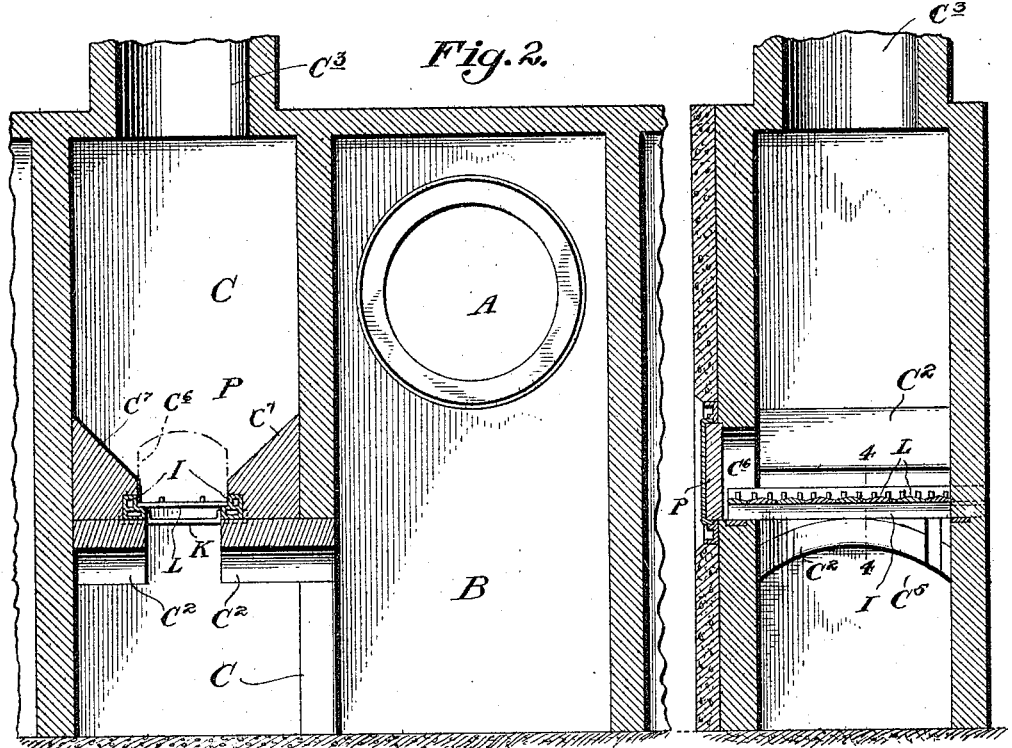
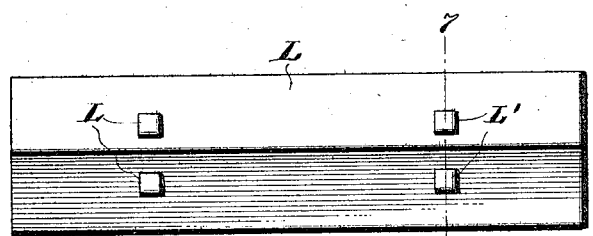
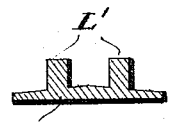
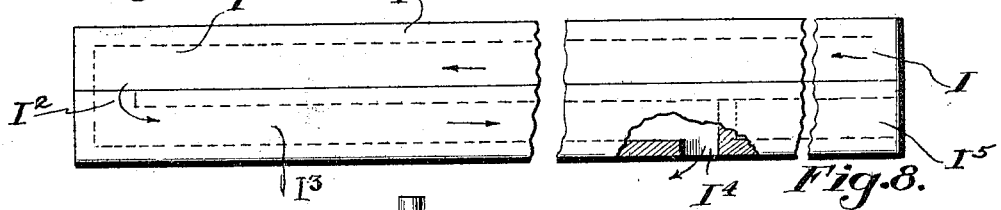
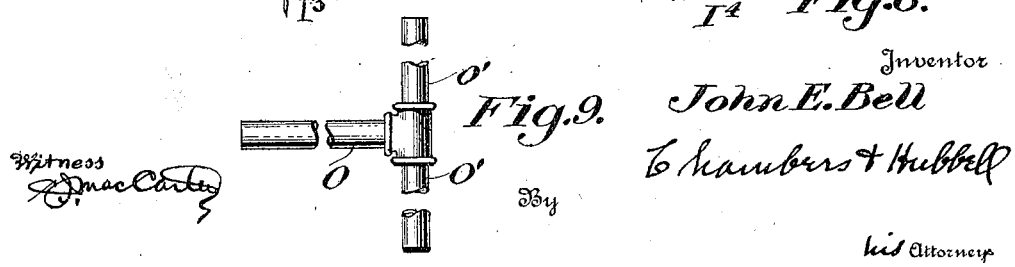
Inventor
John E. Bell
Chambers & Hubbell
his Attorney
Witness

UNITED STATES PATENT OFFICE.

JOHN E. BELL, OF BROOKLYN, NEW YORK.

STACK-SEALING DEVICE.

1,311,435. Specification of Letters Patent. Patented July 29, 1919.

Application filed August 2, 1918. Serial No. 248,079.

*To all whom it may concern:*

Be it known that I, JOHN E. BELL, a citizen of the United States of America, and resident of Brooklyn, in the county of Kings and State of New York, have invented a certain new and useful Improvement in Stack-Sealing Devices, of which the following is a true and exact description, reference being had to the accompanying drawings, which form a part thereof.

My present invention has for its object to provide a simple and effective removable closure for conduits through which gaseous fluids at high temperatures are passed. My improved conduit closure was especially devised for use as a stack sealing device in a plant in which a furnace system proper such as a rotary kiln cement furnace system is associated with one or more waste heat boilers so that the hot products of combustion are sometimes discharged directly to stacks, and are sometimes drawn through the waste heat boilers. In such a system the stack connection for one furnace or kiln is closed off when the products of combustion from that kiln or furnace are passed through the waste heat boiler system, and it is desirable that the closure for the stack connection should not only be durable enough to resist the high temperatures to which it is subjected, but should also be tight to prevent air from being drawn into the waste heat boilers through the stack, with a consequent reduction in the efficiency of the waste heat boiler system.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Figure 1 is a plan view of a portion of a cement kiln furnace and waste heat boiler plant, with parts broken away and in section.

Fig. 2 is a partial section on the line 2—2 of Fig. 1.

Fig. 3 is a partial section on the line 3—3 of Fig. 1.

Fig. 4 is a partial section on the line 4—4 of Fig. 3.

Fig. 5 is a partial section on the line 5—5 of Fig. 4.

Fig. 6 is a plan view of one of the removable closure plates.

Fig. 7 is a section on the line 7—7 of Fig. 6.

Fig. 8 is an elevation, partly broken away and in section, of one of the cast iron lintels employed, and Fig. 9 is a plan view of a tool which may be employed in removing and replacing the removable closure bars.

In the furnace and waste heat boiler plant, shown in Fig. 1, A represents the discharge ends of rotary kilns, each of which opens into a corresponding chamber B. From each chamber B the hot gases issuing from the corresponding kiln A may pass either to a stack chamber C or through a damper controlled outlet D to a bus channel E, which in the plant shown supplies a plurality of waste heat boiler units each collectively indicated by F. In the sectionalized showing in Fig. 1 of one of these waste heat boiler units, there are a plurality of vertical passes F' for the hot gaseous products in each boiler, and an economizer G, which may serve as a boiler feed water heater is interposed between the final pass F' and the fan H employed to draw the products of combustion through the boiler and economizer. Provisions are made at F² for dampers (not shown) employed to cut different boiler units into and out of service, and similarly, provisions are made at D' for dampers (not shown) which are adjusted to establish communication between the chambers B and the bus channel E, or to cut off this communication in accordance with the conditions of use.

Each chamber B is connected to a stack chamber C alongside of it through a port C' at the lower end of these chambers. A stack C³ proper, leads upward from each of the chambers C. Above each port C' the corresponding chamber C is restricted to provide a seat for the removable closure employed to interrupt communication between the stack C³, and the portion of the chamber C above the closure, and the adjacent chamber B when it is desired to pass the products of combustion from the chamber B into the bus channel E through the corresponding outlet passage D. As shown, the chamber C is thus restricted by masonry arches C², and these arches form supports for the closure bars or plates L, which may be slid into and out of place through the doorway $C^6$ normally closed by the removable door P. Advantageously, though not necessarily, the closure bars L rest upon cast iron lintels I supported by the masonry arches $C^2$. In the preferred construction illustrated each of the cast iron lintels I is made L shaped in cross section, and the closure plates or bars L rest at their ends upon the upper side $I^5$ of the base of the L shaped lintel. When the closure plates are removed and the waste products of combustion flow past the cast iron lintels to the stack above them the lintels are subjected to high temperatures, and to prevent the lintels from being destroyed by these temperatures I advantageously provide for an air circulation through them.

For this purpose I form an air passage in each lintel which is open at its outer end to the atmosphere, and is open at its inner end to the corresponding stack chamber. As shown in the drawings, this air passage comprises a portion $I'$ open to the atmosphere at one end of the lintel, and running nearly to the opposite end of the lintel where it is connected by a port $I^2$ to a return channel $I^3$ which runs back toward the end of the lintel at which the channel portion $I'$ opens. At its return end the channel section $I^3$ opens through a port $I^4$ in the bottom wall of the lintel. This port communicates with a channel $C^4$ formed in the corresponding arch $C^2$. A passage $I^5$ in line with the passage $I^3$ and closed at its inner end, but open to the atmosphere at its outer end assists in keeping the corresponding end the lintel cool. The vertical leg of each L shaped lintel I is embedded in brick work $C^7$ supported by the arches $C^2$ and forming a hopper bottom for the upper portion of the stack chamber C thereby minimizing the collection of flue dust above the arches.

The closure bars L are provided with lugs $L'$ by which the bars may be pushed into place and removed through the door way C. To move the bars I into and out of place I may employ a door $C^6$ of a tool O which comprises a shank or handle portion and a cross bar $O'$ adapted to engage at its ends between the pairs of lugs $L'$ provided adjacent each end of each bar L.

When the closure bars L are in place they are advantageously covered by a layer of cement dust or other sealing material to thereby effectually seal the joints between the bars L, and between the latter and the lintels. When the closure bars are removed, the stack section creates an energetic draft through the air passages in the cast iron lintels, thus protecting the latter against injury from the heat. The location of the ports $I^4$ in the under side of the lintels, and in register with the upper ends of the vertical passages $C^5$ practically eliminates the possibility of the air passages in the lintels becoming clogged up with flue dust. When the closure bars are in place the lower end of the corresponding stack chamber C becomes a dead end chamber in which the temperature is not high enough to injure the cast iron lintels even though no circulation of air through the lintels then takes place. Under these conditions the passage of air into the flue system through the circulating passages of the lintels may be stopped by sealing the open outer end of each passage section $I'$. A special advantage of the sealing construction illustrated is that it may be located closely adjacent the mouth of the corresponding kiln and thus minimize the interference with the waste heat boiler efficiency caused by the leakage of air into the portion of the flues between the sealing device and the chamber B, through the necessarily more or less pervious walls of these flues. It will be understood that where the stack to be sealed is very large, a plurality of sets of sealing bars L may be employed in place of the single sealing arrangement illustrated.

While in accordance with the provisions of the statutes I have illustrated and described the best form of my invention now known to me, it will be apparent to those skilled in the art that changes may be made in the form of my invention without departing from its spirit, and that some features of my invention may sometimes be used to advantage without a corresponding use of other features.

Having now described my invention, what I claim as new and desire to secure by Letters Patent, is:

1. In a stack, the combination with the stack wall of horizontal internal supports carried by the stack wall at opposite sides of the stack passage, said stack wall being formed with an opening above said supports, and a series of bars insertible in and removable from the stack through said opening and adapted when inserted therein to rest at their ends upon said supports and form a partition extending across the stack passage.

2. In a stack, the combination with the stack wall of horizontal internal supports carried by the stack wall at opposite sides of the stack passage, said stack wall being formed with an opening above said supports, and a series of bars insertible in and removable from the stack through said opening and adapted when inserted therein to rest at their ends upon said supports and form a partition extending across the stack passage, said bars being formed with lugs on their upper sides adjacent their ends for engagement by a tool for inserting and removing them.

3. In a stack, the combination with the stack wall of horizontal internal supports carried by the stack wall at opposite sides of the stack passage, said stack wall being formed with an opening above said supports, and a series of bars insertible in and removable from the stack through said opening and adapted when inserted therein to rest at their ends upon said supports and form a partition extending across the stack passage, said supports being formed with air cooling channels, open each at one end to the atmosphere and at the other end to the stack passage.

4. The combination with a stack, of sealing provisions therefor comprising a pair of cast iron lintels supported in the stack at opposite sides of the stack passage, and removable means supported by said lintels and adapted to seal said passage.

5. In a stack the combination with the masonry stack wall, of a pair of horizontal cast iron lintels supported by said wall at opposite sides of the stack passage, and a series of metal bars supported at their ends on said lintels and closing the stack passage.

6. In a stack the combination with a masonry stack wall, of a pair of horizontal cast iron lintels supported by the stack wall at opposite sides of the stack passage, said stack wall being formed with an opening at one end of the lintels, and a series of metal plates or bars insertible and removable from said opening, and supported at their ends by said lintels.

7. In a stack the combination with a masonry stack wall, of a pair of horizontal cast iron lintels supported by the stack wall at opposite sides of the stack passage, said stack wall being formed with an opening at one end of the lintels, and a series of metal plates or bars insertible and removable from said opening, and supported at their ends by said lintels, said lintels being formed with air cooling passages open at their outer ends externally of the stack and at their inner ends to the interior of the stack.

8. In a stack the combination with a masonry stack wall, of a pair of horizontal cast iron lintels supported by the stack wall at opposite sides of the stack passage, said stack wall being formed with an opening at one end of the lintels, and a series of metal plates or bars insertible and removable from said opening, and supported at their ends by said lintels, and metallic means spacing said lintels apart.

9. In a stack the combination with the masonry stack wall, of masonry arches formed therein at opposite sides of the stack passage, cast iron lintels mounted on said arches and formed with cooling passages open at the ends of the lintels to the atmosphere, and open within the stack to the interior thereof at the undersides of the lintels, and metallic stack closing plates removably mounted on said lintels.

10. In a furnace system comprising, a rotary kiln and a waste heat boiler section, the combination with a kiln of a kiln head into which one end of the kiln opens, a stack along side the kiln head, and communicating with the latter at its lower end, said kiln head having a separate valved outlet to the waste heat boiler section of the system, and stack being provided immediately above its connection with said kiln head with horizontal supports or shoulders at opposite sides of the stack passages, and with an opening in the stack wall adjacent the ends of said supports, and stack sealing bars insertible and removable through said opening and adapted to be placed on said supports and to seal said stack passage.

JOHN E. BELL.

Copies of this patent may be obtained for five cents each, by addressing the "Commissioner of Patents, Washington, D. C."